United States Patent
Ostertag et al.

(10) Patent No.: US 7,123,591 B1
(45) Date of Patent: Oct. 17, 2006

(54) FREQUENCY MULTIPLEX TRANSMITTER AND METHOD FOR ELIMINATING CROSSTALK

(75) Inventors: Thomas Ostertag, Geretsried (DE); Xihe Tuo, Lake Forest, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,842

(22) PCT Filed: Mar. 3, 1999

(86) PCT No.: PCT/DE99/00562

§ 371 (c)(1),
(2), (4) Date: Jan. 24, 2002

(87) PCT Pub. No.: WO00/52838

PCT Pub. Date: Sep. 8, 2000

(51) Int. Cl.
*H04J 1/00* (2006.01)
*H04B 7/005* (2006.01)

(52) U.S. Cl. ...................... 370/281; 370/278; 375/346; 379/417

(58) Field of Classification Search ............... None
See application file for complete search history.

(56) References Cited

U.S. PATENT DOCUMENTS 5,995,567 A * 11/1999 Cioffi et al. ............... 375/346
6,052,420 A * 4/2000 Yeap et al. ................. 375/346
2005/0226353 A1* 10/2005 Gebara et al. ............. 375/346

* cited by examiner

*Primary Examiner*—Duc Ho
(74) *Attorney, Agent, or Firm*—Staas & Halsey LLP

(57) ABSTRACT

Crosstalk is eliminated in a transceiver which is operated in a frequency-division-multiplex full duplex mode. The technique is suitable in particular for what is referred to as software-defined telecommunications equipment. The frequency division multiplex transceiver has a baseband block, a transmit path and a receive path which respectively transmit and receive on different frequencies (full duplex mode). Furthermore, an auxiliary transmit path is provided which is connected to the receive path and which adds to the received signal a signal whose phase is shifted by 180° with respect to the phase of the crosstalk portion in the first receive path at the summation or superimposition point and which has the same frequency range as the transmit signal. The auxiliary transmit path is driven here, independently of the first transmit path, by the baseband block so as to minimize the crosstalk sensed by the baseband block.

15 Claims, 1 Drawing Sheet

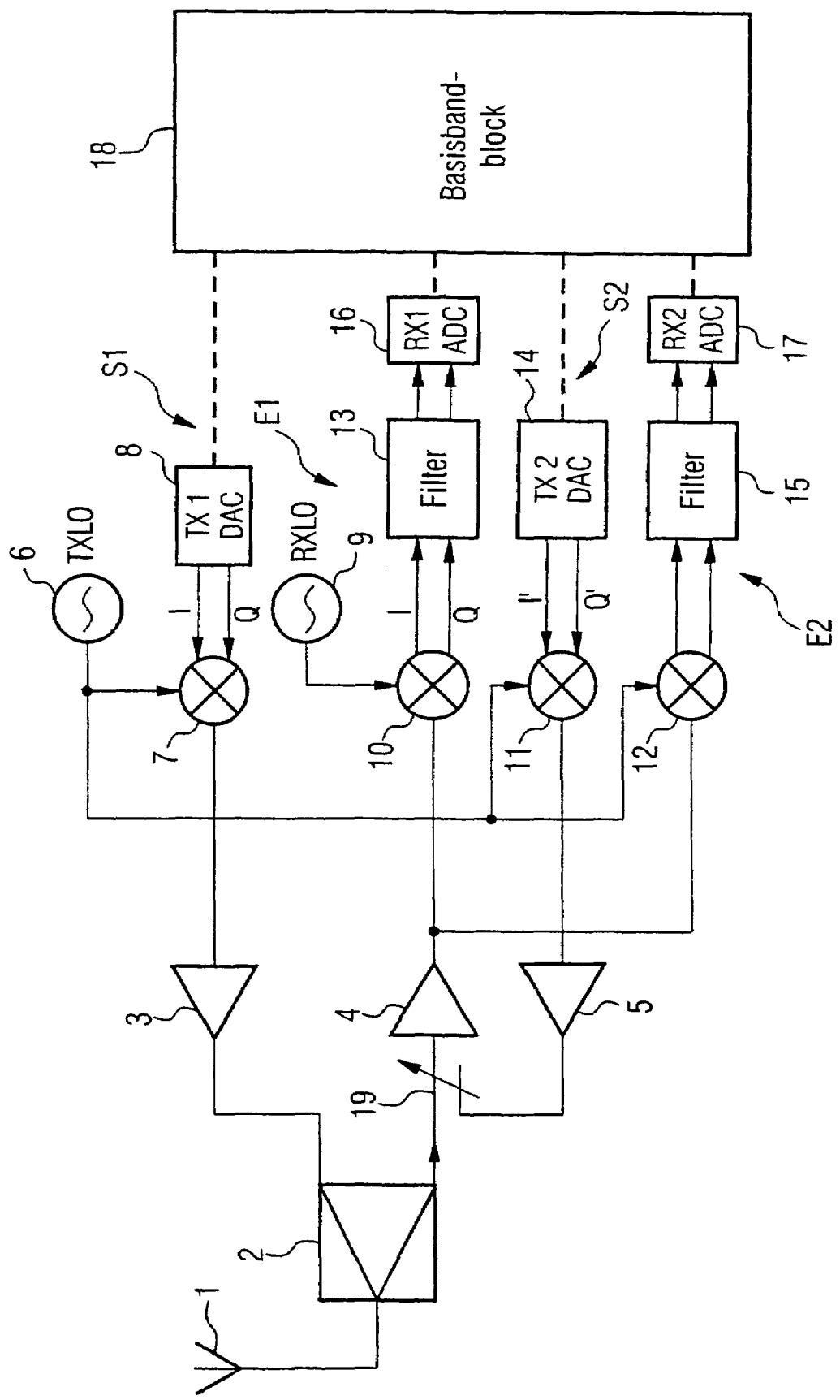

FREQUENCY MULTIPLEX TRANSMITTER AND METHOD FOR ELIMINATING CROSSTALK

CROSS REFERENCE TO RELATED APPLICATIONS

This application is based on and hereby claims priority to PCT Application No. PCT/DE99/00562 filed on Mar. 3, 1999, the contents of which are hereby incorporated by reference.

BACKGROUND OF THE INVENTION

The present invention relates to a frequency division multiplex transceiver and to a method for eliminating crosstalk in a frequency division multiplex transceiver.

When mobile radio devices are constructed, it is necessary to take measures to protect the RF stage against overloading by strong interference signals or other undesired signals. A potential source of interference signals is crosstalk which is generated by the transmit path of a transceiver when it is operated in what is referred to as the full-duplex-frequency division multiplex mode. If the crosstalk generated by the transmit path is very strong in this operating mode, the receive path of the transceiver cannot operate satisfactorily, in particular at relatively weak received signal levels.

On the other hand, in what is referred to as a software-defined mobile radio device or a similar telecommunications device, the RF stage covers a very wide frequency spectrum (for example in a range from several hundred megahertz as far as the gigahertz range). The reason for this is it is intended that in the future a mobile radio device should, if appropriate, also be capable of covering a plurality of standards (GSM, DECT, UMTS, etc.).

Furthermore, a software-defined mobile radio device permits the duplex spacing to be set in a variable and flexible way. For this reason, in this case crosstalk from the transmit path is a particularly critical point which needs to be dealt with.

Theoretically, as far as such elimination of the crosstalk generated by the transmit path is concerned, filter-like duplexers, bandpass filters or stopband filters can be used to reduce the crosstalk in the receive path. These concepts can, of course, also be used in software-defined telecommunications radio devices. However, in the aforesaid technologies the frequency band and the duplex spacing are permanently predefined. On the other hand, this is generally not the case in software-defined devices. This means that, for example, the filters or the duplexers, must be embodied so as to be tunable so that they can also be used with variable frequency bands or duplex spacings. Such tunable filters, duplexers or the like are, however, difficult to implement and are not available at present owing to the requirements made of the size, the weight, the energy consumption and the linearity of mobile radio devices or similar products.

In summary, there are therefore two basic problems which make it more difficult to eliminate the crosstalk:

a) large transmit/receive frequency range which has to be covered in particular by mobile radio devices which operate according to a plurality of standards (DECT, UMTS, GSM), and b) the frequency dependence (frequency response) of the crosstalk within the transmission bandwidth itself.

A further known technology for reducing stray field influences is the analog elimination of crosstalk in the RF stage. According to this technology, part of the transmit power of the transmit path is branched off as an elimination signal and coupled into the receive path with a phase shift of 180° with respect to the transmit signal and with the same frequency as the transmit signal. To do this, a damping element and a phase shifter are provided. The necessary phase shift of 180° is however virtually impossible to obtain in the case of a frequency dependence (frequency response) of the crosstalk within the transmission bandwidth itself because the damping element and the phase shifter generally have a smooth transmission curve.

SUMMARY OF THE INVENTION

One potential object of the present invention has therefore been defined as making available a technique for eliminating crosstalk in frequency division multiplex transceivers which also provides satisfactory results for the case of a frequency dependence (frequency response) of the crosstalk within the transmission bandwidth itself and/or in mobile radio devices which cover a plurality of standards.

the features of the independent claims. The dependent claims develop the central idea of the invention in a particularly advantageous fashion.]

One aspect of the invention therefore provides a frequency division multiplex transceiver which has a baseband block, a transmit path with a local oscillator and a first receive path. The transmit path and the first receive path respectively transmit and receive simultaneously on different frequencies (full duplex technology). Furthermore, what is referred to as an auxiliary transmit path with a mixer controlled as a function of the local oscillator is provided, the auxiliary transmit path being connected to the first receive path and adding to the received signal a signal whose phase is shifted with respect to the phase of the crosstalk portion in the receive path by 180° at the summation or superimposition point, said added signal having the same frequency or the same frequency range as the transmit signal. The method therefore comprises what is referred to as an active elimination of crosstalk. According to one aspect of the present invention, the auxiliary transmit path can be driven by the base bandblock independently of the transmit path.

The baseband block can sense crosstalk of the transmit path and then drive the auxiliary transmit path as a function of the sensing of the crosstalk.

The baseband block can in particular sense the amplitude and the phase of the crosstalk of the transmit path as a function of the transmit frequency.

In order to sense the crosstalk of the transmit path, it is possible to provide for the receive signal and the crosstalk to be fed unfiltered to the baseband block.

In order to sense the crosstalk of the first transmit path, it is possible to provide a second receive path which is independent of the first receive path and has a mixer embodied as an intermediate-frequency converter which downmixes the crosstalk on the basis of the transmit frequency just used.

The baseband block can drive the auxiliary transmit path to minimize the sensed crosstalk of the transmit path.

The baseband block can drive the auxiliary transmit path in the frequency domain using a transfer function of the crosstalk multiplied by the inverted transmit signal.

In the time domain, the baseband block can carry out a folding calculation of the crosstalk with the transmit signal in order to drive the auxiliary transmit path.

One aspect of the present invention provides a method for eliminating the crosstalk in a frequency division multiplex transceiver. The frequency division multiplex transceiver has a baseband block, a transmit path and a first receive path which respectively transmit and receive simultaneously on different frequencies. Furthermore, an auxiliary transmit path is provided which is connected to the first receive path and which adds to the received signal a signal whose phase is shifted by 180° with respect to the phase of the crosstalk portion at the summation or superimposition point, the signal having the same frequency or the same frequency range as the transmit signal, so that an active elimination of the crosstalk takes place. The baseband block drives the auxiliary transmit path to minimize the crosstalk independently of the transmit path.

The baseband block can sense crosstalk of the transmit path and then drive the auxiliary transmit path as a function of the sensing of the crosstalk.

The baseband block can sense the amplitude and phase of the crosstalk of the transmit path as a function of the transmit frequency.

In order to sense the crosstalk of the transmit path, the receive signal and the superimposed crosstalk can be fed unfiltered to the baseband block.

In order to sense the crosstalk of the transmit path, a second receive path can be used in which the crosstalk is downmixed on the basis of the transmit frequency, just used, of the transmit path.

The baseband block can drive the auxiliary transmit path in the frequency domain using a transfer function of the crosstalk multiplied by the inverted transmit signal.

In order to drive the auxiliary transmit path, the baseband block can carry out a folding calculation of the crosstalk with the transmit signal in the time domain.

BRIEF DESCRIPTION OF THE DRAWINGS

These and other objects and advantages of the present invention will become more apparent and more readily appreciated from the following description of the preferred embodiments, taken in conjunction with the accompanying drawings of which the appended FIGURE is a schematic view of a block circuit diagram of an exemplary embodiment of a frequency division multiplex transceiver according to the invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The figure shows that a total of four transmit and receive paths are provided between a power amplifier 3, or a receiving amplifier with low noise 4, and a baseband block 18, said transmit and receive paths being namely:
  the actual transmit path S1 which is used to emit signals,
  the actual first receive path E1 which is used to receive signals,
  what is referred to as an auxiliary transmit path S2 which does not have any actual transmitting function but instead serves only to actively eliminate the crosstalk of the first transmit path S1, and
  a second receive path E2 which, in contrast to the first receive path E1 does not have any actual reception function but rather is merely used to sense the crosstalk which is generated by the transmit path S1 in the full duplex mode.

In what follows, the individual paths of the frequency division multiplex transceiver according to one aspect of the invention illustrated in the figure, which is operated in full duplex mode, will now be explained in detail.

First, the transmit path S1 will be explained. Data to be transmitted is sent from the baseband block 18, for example, on a first intermediate frequency TX1, to a digital/analog converter 8. This digital/analog converter 8 then transmits the I and Q component of the data to a converter 7, which is connected to a local oscillator 6 at the frequency TXLO, and thus converts the data which is to be output to the transmit frequency range. The output signal of the mixer 7 is transmitted to a power amplifier 3 which is connected to an antenna 1 by a duplexer 2. In the event of two different antennas being used for the transmit and receive modes there is, of course, no need for a duplexer 2.

Now, the first receive path E1 will be explained. In the full duplex mode, signals are received by the antenna 1 at the same time as the transmit mode in the first transmit path S1, and are transmitted by the duplexer 2 to a receiving amplifier 4 with low noise (LNA—Low Noise Amplifier). The output signal of the receiving amplifier 4 is transmitted to a mixer 10 which is connected to a local oscillator 9 at the receive frequency RXLO. In this way, the received signals are downmixed to an intermediate frequency RX1, the I and Q components of the received signals are sensed and transmitted by a first filter 13 to an AD converter 16 which then feeds the data digitized in this way to the baseband block.

The auxiliary transmit path S2 will now be explained. This auxiliary transmit path S2 is driven independently of the transmit path S1 of the baseband block 18, i.e. the corresponding baseband signals are transmitted to a DA converter 14 which then feeds the corresponding I'/Q' components at a second intermediate frequency TX2 to a mixer 11. The mixer 11 converts the fed data, i.e. the I'/Q' components to the transmit frequency TXLO which corresponds to that frequency or that frequency band which is currently being used in the transmit path S1. The baseband block 18 drives in such a way that the phase of the signal in the auxiliary transmit path S2 is precisely 180° with respect to the crosstalk portion in the first receive path E1.

The output signal of the mixer 11 of the auxiliary transmit path S2 is in turn power-amplified by the amplifier 5 and then fed to a coupler 19 in order to couple it into the first receive path E1 in such an amplified form. The auxiliary transmit path S2 is driven by the baseband block 18 here in such a way that crosstalk which is generated by the transmit path S1 in the full duplex mode is eliminated or at least subsequently reduced, as a result of the coupling of the output signal of the auxiliary transmit path S2 into the first receive path E1 by the coupler 19.

The second receive path E2 which, as explained in more detail below, is merely an option and does not necessarily have to be provided, will not be explained. In the second receive path E2, the output signal of the receiving amplifier 4 of the first receive path E1 is fed to the mixer 12 which is connected to the transmit local oscillator 6 at the frequency TXLO, and the extracted signal of the first receive path E1 is thus downmixed to an intermediate frequency RX2. It is to be noted that, in addition to the actual received signal, the output signal of the receiving amplifier 4 of the first receive path 1 of course also contains the superimposed crosstalk of the first transmit path S1 in the full duplex mode. The output signal of the mixer 12 of the second receive path E2 is fed via a filter circuit 15 to an A/D converter 17 which in turn supplies the data digitized in this way to the baseband block 18. As already mentioned, the second receive path E2 is merely provided as an option and is used in this case to sense the crosstalk of the first transmit path S1 which is frequency-dependent where possible.

The operation of the full duplex (frequency division multiplex) transceiver illustrated in the figure will now be explained. The following steps are carried out in order to eliminate crosstalk portions:

The auxiliary transmit path S2 can be driven by the baseband block 18 independently of the transmit path S1. The output power of this auxiliary transmit path S2, i.e. the corresponding amplification of the amplifier 5 is significantly smaller in comparison to the output power which is made available by the power amplifier 3 of the actual transmit path S1. The reason for this is that the crosstalk is generally at least 15 dB below the transmit path power if a coupler is used or if two antennas are used for separating the transmit and receive signals. For this reason, the energy consumption in the auxiliary transmit path S2, in particular, of the energy consumption by the auxiliary transmit amplifier 5 is very low in comparison to the energy consumption relating to the actual transmit path S1.

As the next step, the crosstalk in the baseband block 18 is sensed. The phase and amplitude of the crosstalk are thus sensed. A prerequisite for this is the channel selection is made in the baseband. This means that the crosstalk is transmitted to the baseband block 18 superimposed on the actual receive signal without pre-filtering. If, as is the case in the figure, the crosstalk superimposed on the actual receive signal is fed to the baseband block 18 filtered (filter 13) in the first receive path E1, the second receive path E2, which has an additional intermediate frequency circuit (mixer 12) is provided. The crosstalk can thus be sensed separately.

As the next step, after the sensing of the crosstalk, to be more precise, after the sensing of both the phase and the amplitude of the crosstalk, an algorithm is executed in the baseband block 18 in order to set the phase and the amplitude of the output signal of the auxiliary transmit path S2 by corresponding driving by the baseband block 18, in such a way that the crosstalk is actively compensated (coupler 19). The auxiliary transmit path S2 is therefore driven by the baseband block 18 in such a way that the crosstalk which is continuously sensed drops below a predetermined acceptable limiting level. As soon as the crosstalk which is continuously sensed in the baseband block 18 has dropped below the aforesaid limiting level, the transceiver, i.e. to be more precise, the receive path E1, can be operated without being adversely affected by crosstalk from the transmit path S1.

In the event of the crosstalk having a strong frequency dependence within the transmit bandwidth of the transmit path S1, this frequency dependence of crosstalk is sensed in the baseband block 18, evaluated and, if appropriate, the phase and amplitude of the cross talk are stored in the baseband block 18 as a function of the frequency within the transmit frequency range. In the event of a strong frequency dependence of the crosstalk within the transmit bandwidth, the auxiliary transmit path S2 is driven using the transfer function of the crosstalk multiplied by the inverted transmit signal (in the frequency domain). For a software-defined telecommunications radio device which is operated in the time domain, this means that a folding calculation is carried out in the baseband block 18 in order to do this.

The transceiver and method described above can therefore actively eliminate crosstalk from the transmit path, i.e. bring it below a specific limiting level, in particular in software-defined telecommunications radio devices, so that the receive path is no longer adversely affected by the crosstalk. In comparison with the prior art, the invention therefore may have the further advantage that sideband noise of the transmit oscillator is suppressed.

The invention has been described in detail with particular reference to preferred embodiments thereof and examples, but it will be understood that variations and modifications can be effected within the spirit and scope of the invention.

The invention claimed is:

1. A frequency division multiplex transceiver having the following features: a baseband block, a transmit path with a local oscillator and a first receive path are connected to one another in such a way that they respectively transmit and receive simultaneously on different frequencies, an auxiliary transmit path having a mixer supplied by the local oscillator is connected to the first receive path and adds to the received signal a signal whose phase is shifted by 180° with respect to the phase of the crosstalk portion in the first receive path at the summation or superposition point and which has the same frequency or the same frequency range as the transmit signal, the auxiliary transmit path can be driven by the baseband block independently of the first transmit path in such a way that the compensation signal is present at the output of the mixer.

2. The frequency division multiplex transceiver as claimed in claim 1, wherein the baseband block senses crosstalk of the transmit path and drives the auxiliary transmit path as a function of the sensing of the crosstalk.

3. The frequency division multiplex transceiver as claimed in claim 2, wherein the baseband block senses the amplitude and phase of the crosstalk of the transmit path as a function of the transmit frequency.

4. The frequency division multiplex transceiver as claimed in claim 2, wherein, in order to sense the crosstalk of the transmit path, the receive signal and the crosstalk can be fed unfiltered to the baseband block.

5. The frequency division multiplex transceiver as claimed in claim 2, wherein, in order to sense the crosstalk of the transmit path, a second receive path is provided which has a further mixer which downmixes the crosstalk on the basis of the transmit frequency currently used.

6. The frequency division multiplex transceiver as claimed in claim 1, wherein the baseband block drives the auxiliary transmit path to minimize the sensed crosstalk of the transmit path.

7. The frequency division multiplex transceiver as claimed in claim claim 1, wherein the baseband block drives the auxiliary transmit path in the frequency domain using a transfer function of the crosstalk multiplied by the inverted transmit signal.

8. The frequency division multiplex transceiver as claimed in claim 1, wherein, in order to drive the auxiliary transmit path, the baseband block carries out a folding calculation of the crosstalk with the transmit signal in the time domain.

9. A method for eliminating crosstalk in a frequency division multiplex transceiver having the following features:

a baseband block, a transmit path and a first receive path transmit and receive simultaneously on different frequencies, an auxiliary transmit path which is connected to the first receive path, adds to the received signal a signal whose phase is shifted by 180° with respect to the phase of the crosstalk portion in the first receive path at the summation or superposition point, the signal having the same frequency or the same frequency range as the transmit signal, the baseband block drives the auxiliary transmit path to minimize the crosstalk, independently of the transmit path.

10. The method as claimed in claim 9, wherein the baseband block senses crosstalk of the transmit path and drives the auxiliary transmit path as a function of the sensing of the crosstalk.

11. The method as claimed in claim 10, wherein the baseband block senses the amplitude and phase of the crosstalk of the transmit path as a function of the transmit frequency.

12. The method as claimed in claim 10, wherein, in order to sense the crosstalk of the transmit path, the receive signal and the crosstalk are fed unfiltered to the baseband block.

13. The method as claimed in claim 10, wherein, in order to sense the crosstalk of the transmit path, a second receive path is used in which the crosstalk is downmixed on the basis of the transmit frequency currently used.

14. The method as claimed in claim 9, wherein the baseband block drives the auxiliary transmit path in the frequency domain using a transfer function of the crosstalk multiplied by the inverted transmit signal.

15. The method as claimed in claim 9, wherein, in order to drive the auxiliary transmit path, the baseband block carries out a folding calculation of the crosstalk with the transmit signal in the time domain.

* * * * *

UNITED STATES PATENT AND TRADEMARK OFFICE
CERTIFICATE OF CORRECTION

| | | |
|---|---|---|
| PATENT NO. | : 7,123,591 B1 | Page 1 of 1 |
| APPLICATION NO. | : 09/914842 | |
| DATED | : October 17, 2006 | |
| INVENTOR(S) | : Thomas Ostertag et al. | |

It is certified that error appears in the above-identified patent and that said Letters Patent is hereby corrected as shown below:

In the drawings:

Fig. 1, box 18, change "Basisband" to --baseband--.

Column 2, Lines 21-23, below "standards." delete lines 21-23 entirely.

Column 6, Line 53, after "claimed in" delete "claim".

Signed and Sealed this

Third Day of July, 2007

JON W. DUDAS
*Director of the United States Patent and Trademark Office*